US011755880B2

United States Patent
Gao et al.

(10) Patent No.: US 11,755,880 B2
(45) Date of Patent: Sep. 12, 2023

(54) METHOD AND APPARATUS FOR OPTIMIZING AND APPLYING MULTILAYER NEURAL NETWORK MODEL, AND STORAGE MEDIUM

(71) Applicant: CANON KABUSHIKI KAISHA, Tokyo (JP)

(72) Inventors: Hongxing Gao, Beijing (CN); Wei Tao, Beijing (CN); Tsewei Chen, Tokyo (JP); Dongchao Wen, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 761 days.

(21) Appl. No.: 16/295,384

(22) Filed: Mar. 7, 2019

(65) Prior Publication Data
US 2019/0279072 A1    Sep. 12, 2019

(30) Foreign Application Priority Data
Mar. 9, 2018   (CN) .......................... 201810193968.9
Nov. 21, 2018  (CN) .......................... 201811389762.X

(51) Int. Cl.
*G06N 3/04*    (2023.01)
*G06N 3/08*    (2023.01)

(52) U.S. Cl.
CPC ................. *G06N 3/04* (2013.01); *G06N 3/08* (2013.01)

(58) Field of Classification Search
CPC .......... G06N 3/04; G06N 3/08; G06N 3/0454; G06N 20/00; G06N 3/082; G06N 5/04; G06F 2207/4824; H04N 19/124; H04N 19/517; H03M 7/24; H03M 7/3059
See application file for complete search history.

(56) References Cited

U.S. PATENT DOCUMENTS

2016/0148078 A1    5/2016  Shen et al.

FOREIGN PATENT DOCUMENTS

| WO | 2018/016608 A1 | 1/2018 | |
| WO | WO-2018140294 A1 * | 8/2018 | ............... G06N 3/08 |

OTHER PUBLICATIONS

Umuroglu et al. Streamlined Deployment for Quantized Neural Networks, Sep. 12, 2017. (Year: 2017).*

(Continued)

*Primary Examiner* — Ann J Lo
*Assistant Examiner* — Van C Mang
(74) *Attorney, Agent, or Firm* — Canon U.S.A., Inc. IP Division

(57) ABSTRACT

A method and an apparatus for optimizing and applying a multilayer neural network model, and a storage medium are provided. The optimization method includes, dividing out at least one sub-structure from the multilayer neural network model to be optimized, wherein a tail layer of the divided sub-structure is a quantization layer, and transferring operation parameters in layers other than the quantization layer to the quantization layer for each of the divided sub-structures and updating quantization threshold parameters in the quantization layer based on the transferred operation parameters. When a multilayer neural network model optimized based on the optimization method is operated, the necessary processor resources can be reduced.

10 Claims, 9 Drawing Sheets

(56) References Cited

OTHER PUBLICATIONS

Ioffe et al. Batch Normalization: Accelerating Deep Network Training by Reducing Internal Covariate Shift (Mar. 2, 2015) (Year: 2015).*
Li et al. DeepRebirth: Accelerating Deep Neural Network Execution on Mobile Devices (Aug. 16, 2017) (Year: 2017).*
Ando et al. BRein Memory: A Single-Chip Binary/Ternary Reconfigurable in-Memory Deep Neural Network Accelerator Achieving 1.4 TOPS at 0.6 W (Dec. 19, 2017) (Year: 2017).*
Cheng et al. A Survey of Model Compression and Acceleration for Deep Neural Networks (Oct. 23, 2017) (Year: 2017).*
Susumu Maruno, et al., Adaptive Learning Tone Correction Using Quantizer Neurons for Full Color Image Reproduction, Journal of the IIEEJ, Aug. 5, 2011, pp. 762-771, vol. 38, No. 5.

* cited by examiner

METHOD AND APPARATUS FOR OPTIMIZING AND APPLYING MULTILAYER NEURAL NETWORK MODEL, AND STORAGE MEDIUM

CROSS-REFERENCE TO RELATED APPLICATIONS

This application is a Non Provisional patent application, which claims the benefit of Chinese patent application No. 201810193968.9 filed Mar. 9, 2018, and Chinese patent application No. 201811389762.X filed Nov. 21, 2018, all of which are hereby incorporated by reference herein in their entirety.

BACKGROUND

Field of the Disclosure

The present disclosure relates to a modeling field for a multilayer neural network, and more particularly to a method and an apparatus for optimizing and applying a multilayer neural network model for saving processor resources, and a storage medium.

Description of the Related Art

In the art of Artificial Intelligence (AI), a network architecture based on Deep Learning is one of the most widely used architectures at present. The network architecture based on Deep Learning is actually a multilayer neural network structure that models a multilayer neural network model by using a preset training set, such as a set of pictures and corresponding description data or a set of voices and corresponding description data. Each of layers in the multilayer neural network model may contain neuron operations in which the result of the neuron operations of an upper layer is used as an input of the neuron operations of a lower layer in two adjacent layers, thereby training from top to bottom and thus modeling the multilayer neural network model. In the modeling procedure, each time one layer is trained, parameters may be finely tuned by using a method of back propagation, in order to obtain a multilayer neural network model having a better performance.

A convolutional neural network (CNN) model is a most commonly used multilayer neural network model at present. In the technical fields of computer vision, computer auditory and natural language processing, the convolutional neural network model has been widely used. However, in the multilayer neural network model modeled currently, its operation will cause a large amount of memory overhead and occupy a large number of processor resources. Although a better data processing effect can be obtained when the multilayer neural network model is operated on a GPU-based workstation or server, reducing the processor resources occupied when the network model is operated is still one of the goals of improving the performance of the network model. On the other hand, since the processor resources of current embedded devices, such as smartphones, tablets and the like, are limited, it is more tended to use fixed-point numbers (integers) to complete more efficient operations. In this case, it needs to use a fixed-point operation to convert floating-point parameters in each layer in the network into fixed-point parameters to adapt to the operation requirement of the embedded devices. However, since the fixed-point operation is a lossy operation, it will bring cumulative errors to the entire system by executing the fixed-point operation in the neural network layer by layer, which results in a significant deterioration in the system performance. Therefore, the multilayer neural network model can hardly be operated on the embedded devices.

SUMMARY

In view of the technical problems existing in the above conventional multilayer neural network model, the present disclosure intends to provide a scheme for optimizing the conventional multilayer neural network model to reduce processor resources necessary to operate a multilayer neural network model.

According to an aspect of the present disclosure, there is provided an apparatus for optimizing a multilayer neural network model, comprising: a sub-structure dividing module configured to divide out at least one sub-structure from the multilayer neural network model, wherein a tail layer of the divided sub-structure is a quantization layer; and a data transferring module configured to transfer operation parameters in layers other than the quantization layer to the quantization layer for each of the divided sub-structures and update quantization threshold parameters in the quantization layer based on the transferred operation parameters.

According to another aspect of the present disclosure, there is provided an apparatus for applying a multilayer neural network model, comprising: a saving module configured to save the multilayer neural network model; an inputting module configured to input, to the saved multilayer neural network model, a data set corresponding to a task requirement that is executable by the multilayer neural network model; and an operating module configured to operate the data set in each of layers from top to bottom in the multilayer neural network model and output results.

According to another aspect of the present disclosure, there is provided a method for optimizing a multilayer neural network model, comprising: dividing out at least one sub-structure from the multilayer neural network model, wherein a tail layer of the divided sub-structure is a quantization layer; and transferring operation parameters in layers other than the quantization layer to the quantization layer for each of the divided sub-structures and updating quantization threshold parameters in the quantization layer based on the transferred operation parameters.

According to another aspect of the present disclosure, there is provided a method for applying a multilayer neural network model, comprising: saving the multilayer neural network model; inputting, to the saved multilayer neural network model, a data set corresponding to a task requirement that is executable by the multilayer neural network model; and operating the data set in each of layers from top to bottom in the multilayer neural network model and outputting results.

According to another aspect of the present disclosure, there is provided a non-transitory computer readable storage medium storing instructions for causing a computer to perform a method for optimizing a multilayer neural network model when executed by the computer, the method comprising: dividing out at least one sub-structure from the multilayer neural network model, wherein a tail layer of the divided sub-structure is a quantization layer; and transferring operation parameters in layers other than the quantization layer to the quantization layer for each of the divided sub-structures and updating quantization threshold parameters in the quantization layer based on the transferred operation parameters.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description of the embodiments, serve to explain the principles of the present disclosure.

DESCRIPTION OF THE EMBODIMENTS

Various exemplary embodiments of the present disclosure will be described in detail below with reference to the drawings. It should be understood that the present disclosure is not limited to the various exemplary embodiments described below. In addition, as a solution to solve the problem of the present disclosure, it is not necessary to include a combination of the features described in all of the exemplary embodiments.

Figure 1:
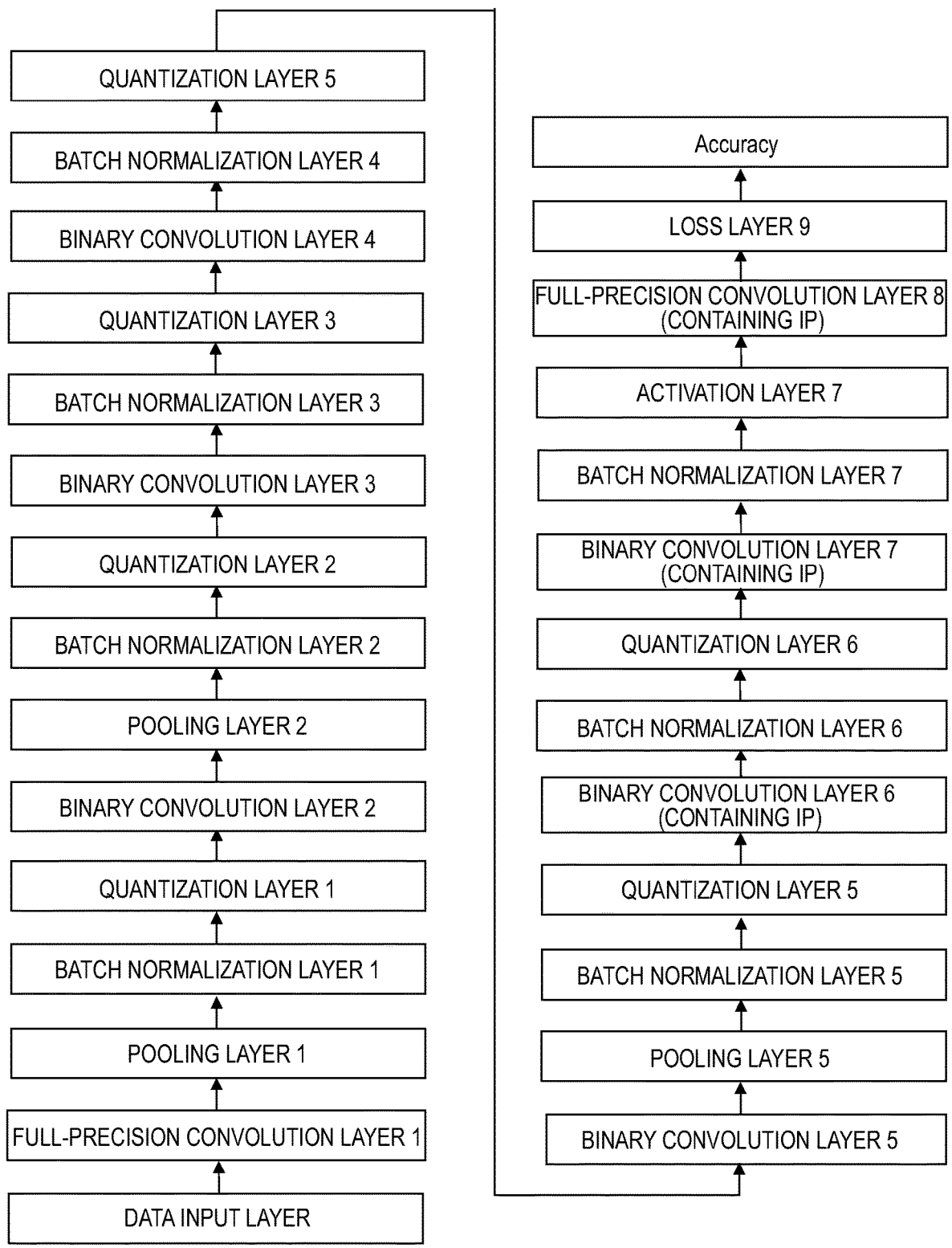
FIG. 1 shows an example of a binary convolutional neural network model to be optimized.

The structure of the conventional multilayer neural network model is mostly complicated. In order to simplify its structure, binarization processing may be performed on the network model. FIG. 1 illustrates a convolutional neural network model undergone the binarization processing.

Referring to FIG. 1, a binary convolutional neural network model trained and generated using known techniques is illustrated. When the binary convolutional neural network model shown in FIG. 1 is trained and generated, the training set is first input according to the task requirement. The task requirement herein refers to the purpose of modeling the binary convolutional neural network model, that is, the network model is used to perform what kind of data processing. For example, if the task requirement is picture classification processing, the binary convolutional neural network model is used to perform data processing for classifying the pictures; and for another example, if the task requirement is speech recognition processing, the binary convolutional neural network model is used to perform data processing for recognizing speech. After the task requirement is determined, a training set that matches the task requirement is input. For example, if the task requirement is the picture classification processing, a set of pictures and description data (e.g., annotated truth values, etc.) corresponding to the pictures are input as the training set. For another example, if the task requirement is the speech recognition processing, a set of speeches and description data corresponding to the speeches are input as the training set. Then, the binary convolutional neural network model shown in FIG. 1 is trained and generated by using the input training sets with a preset training strategy. The generated binary convolutional neural network model has the following two aspects of characteristics.

Characteristic 1: the weight parameters (Weights) are binarized.

In order to simplify the operation, the binarization processing is performed for Weights in a convolution layer of the binary convolutional neural network model, that is, the Weights are represented by using 1 bit according to a sign (positive or negative) of the Weights, wherein the Weights having a positive value are represented by +1 after being binarized, and the Weights having a negative value are represented by −1 after being binarized. Further, in consideration of the operation accuracy, in order to make the operation result based on the Weights after binarization processing approximate to the operation result based on the full-precision Weights (i.e., the Weights not undergone binarization processing), in other words, in order to make the convolution operation result of the binarized Weights and the input feature map input to the convolution layer approximate to the convolution operation result of the full-precision Weights and the input feature map input to the convolution layer, one scaling coefficient α may be contained in each of the convolution filters. This scaling coefficient α is used to improve the accuracy of the operation result using the binarized Weights, that is, the product of the binarized Weights and α is used to approximate the full-precision Weights. This scaling coefficient α may be calculated according to the following formula (1).

$$\alpha = \frac{|W|_{l1}}{n} \quad (1)$$

Wherein $|W|_{l1}$ denotes a norm L1 corresponding to the filter in case of full-precision Weights; n denotes the number of Weights of the filter.

Based on the above formula (1), a convolution operation based on the binarized Weights after may be expressed by the following formula (2).

$$Y_1 = (W_b \otimes X_1) * \alpha + b \quad (2)$$

Wherein $W_b$ denotes a convolution filter when binary Weights are used; α denotes a scaling coefficient of the convolution filter when binary Weights are used; ⊗ denotes a convolution operation; b denotes an offset parameter of the convolution operation; $X_1$ denotes an input feature map input to a convolution layer (i.e., the output of the upper layer of the convolution layer); $Y_1$ denotes the output of the convolution layer.

Characteristic 2: the input feature maps (FeatureMaps) are quantized by using multiple bits.

In a quantization layer, according to a certain quantization threshold strategy (for example, by using a specific quantization threshold parameter), each of elements in the input feature map from the upper layer of the quantization layer may be quantized (mapped) into a numerical space expressed by k bits, wherein k is a positive integer and the selection of k depends on the operation accuracy requirement on the multilayer neural network model to be modeled. If the operation accuracy requirement on the network model is higher, a larger k value may be selected, such as a k value of 4; if the operation accuracy requirement on the network model is lower, a smaller k value may be selected, such as a k value of 2.

Taking the k value of 2 as an example, several center point elements are selected from each of the elements in the input feature map from the upper layer of the quantization layer, for example, 0, 0.538, 1.076, and 1.614 are selected as center point elements, and quantization threshold parameters used during the quantization processing are determined based on these center point elements. Then, each of elements in the input feature map is compared with the quantization threshold parameter, and each of elements is quantized into a numerical space expressed by 2 bits according to the result of comparison. Specifically, the quantization processing may be performed by using the quantization threshold strategy shown in the following formula (3).

$$Y_i = \begin{cases} 0, & \text{if } X_i \leq 0 \\ 0.538, & \text{if } 0 < X_i \leq 0.807 \\ 1.076, & \text{if } 0.807 < X_i \leq 1.345 \\ 1.614, & \text{if } 1.345 < X_i < \infty \end{cases} \quad (3)$$

Wherein $X_i$ denotes the i-th element in the input feature map from the upper layer of the quantization layer, i is a positive integer, and $Y_i$ denotes the output of the quantization layer for the i-th element in the input feature map. As can be seen from the formula (3), the quantization threshold strategy used in the quantization layer is to determine the numerical value, into which the i-th element in the input feature map is quantized, based on the quantization threshold parameters 0, 0.807, 1.345, and ∞. When $X_i$ is less than 0, the i-th element is quantized into 0, that is, the output of the quantization layer is 0; when $X_i$ is between the quantization threshold parameters 0 and 0.807, the i-th element is quantized into 0.538, that is, the output of the quantization layer is 0.538; when $X_i$ is between the quantization threshold parameters 0.807 and 1.345, the i-th element is quantized into 1.076, that is, the output of the quantization layer is 1.076; and when $X_i$ is greater than the quantization threshold parameter 1.345, the i-th element is quantized into 1.614, that is, the output of the quantization layer is 1.614. By the quantization operation shown in the above formula (3), all elements in the input feature map may be quantized (mapped) onto the selected center point element at the quantization layer, such that the result output from the quantization layer is the value of the selected center point element.

In the above formula (3), the quantization threshold parameters are calculated in such a manner as to average the selected center point elements:

0.807=(0.538+1.076)/2, 1.345=(1.076+1.614)/2

Of course, the calculation manner of determining the quantization threshold parameters is not limited to the above-described manner of averaging the selected center point elements, and other known calculation methods may be employed.

Assuming that the non-zero minimum term in the above formula (3) is denoted as β', the formula (3) may be further evolved into the formula (4).

$$Y_i = \beta' * \begin{cases} 0, & \text{if } X_i \leq 0 \\ 1, & \text{if } 0 < X_i \leq 0.807 \\ 2, & \text{if } 0.807 < X_i \leq 1.345 \\ 3, & \text{if } 1.345 < X_i < \infty \end{cases} \quad (4)$$

Wherein β'=0.538.

It can be seen from the above formula (4) that $Y_i$ may be further expressed as $Y_i = \beta' Y_q$, wherein $Y_q$ is a representation of the corresponding integer part of $Y_i$, and the value of the element thereof takes an integer of 0 or 1 or 2 or 3.

Figure 4A:
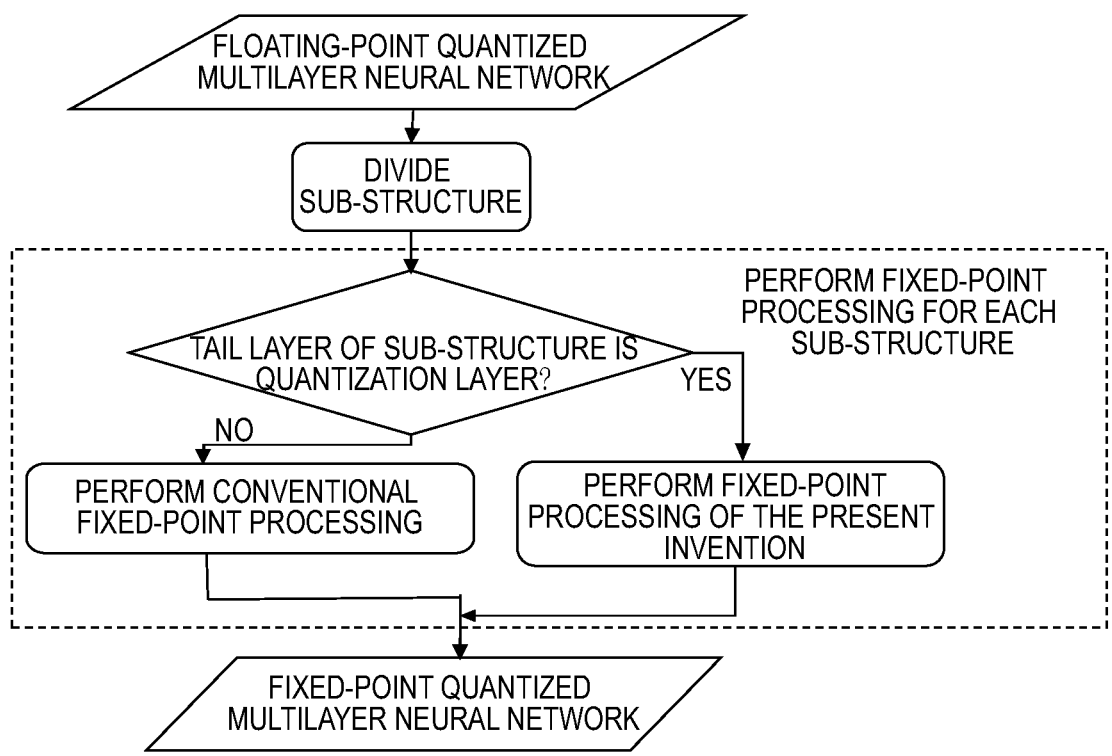
FIGS. 4A and 4B show flowcharts for optimizing the multilayer neural network model, respectively.

It can be seen from the above formula (4) that the value output from the quantization layer and mapped through quantization is a floating-point number when the data processing task is performed by using the binary convolutional neural network model shown in FIG. 1. Therefore, for the lower layer of the quantization layer, each of elements in the input feature map is a 32-bit floating-point number, such that the operation for the floating-point number may cause a large amount of memory overhead and occupy a large number of processor resources. Generally, hardware devices are more tended to use integers to perform operations in order to achieve more efficient operations. Based on this, the present disclosure proposes a method for optimizing a conventional multilayer neural network model. Referring to FIG. 4 (a), firstly, a sub-structure is divided out as for a floating-point quantized multilayer neural network. If the tail layer of the divided sub-structure is a quantization layer (i.e., a sub-structure that can be processed by using the scheme of the embodiment of the present disclosure), then it may undergo the fixed-point processing by using the scheme of the embodiment of the present disclosure, thereby obtaining a fixed-point multilayer neural network; if the tail layer of the divided sub-structure is not a quantization layer but other layers such as an activation layer (i.e., a sub-structure that cannot be processed by using the scheme of the embodiment of the present disclosure), then it may be processed by using other known algorithms. In the fixed-point processing in the embodiment of the present disclosure, the operation parameters and the operation procedures during the operation of the neurons in each of layers before the quantization layer may be transferred downward equivalently based on an algorithm such as a network forward calculation rule, until the operation parameters and the operation procedures in each of layers are transferred to the quantization layer to form a reconstructed sub-structure in a joint quantization form, thereby outputting the feature map in integer form from the quantization layer, which may effectively reduce the server resources used during the operation of the multilayer neural network model and save the memory overhead.

The hardware configuration of the apparatus for optimizing the multilayer neural network model in the embodiment of the present disclosure will be described below with reference to FIG. 3.

<Hardware Configuration of Apparatus for Optimizing Multilayer Neural Network Model>

Figure 3:
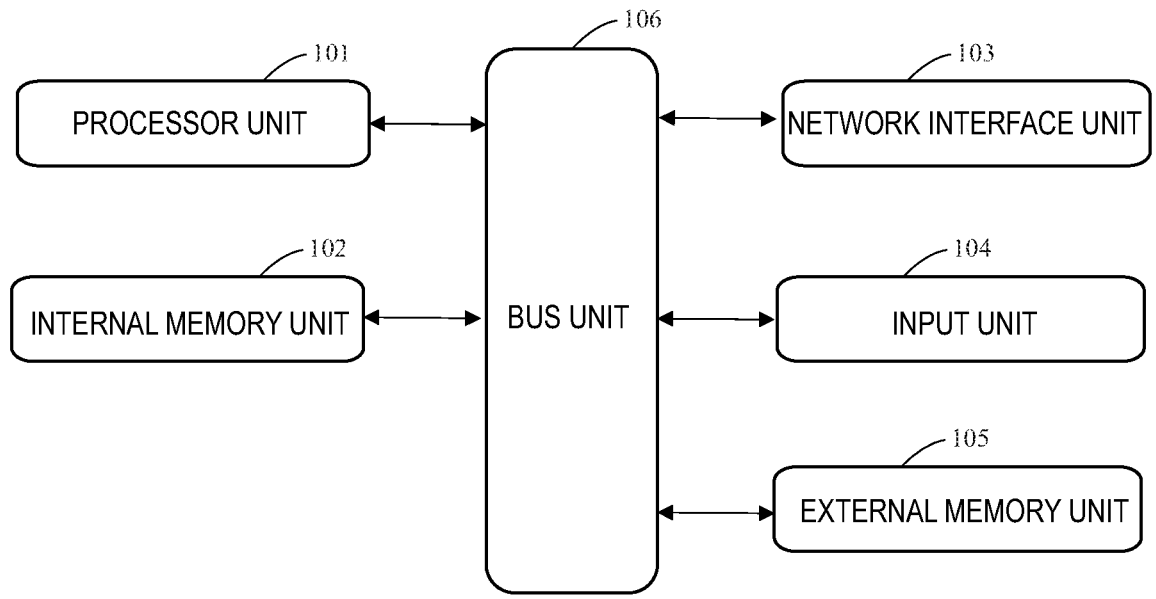
FIG. 3 shows a block diagram of the hardware configuration of an apparatus for optimizing a multilayer neural network model.

FIG. 3 shows a schematic diagram of the hardware configuration of an apparatus for optimizing a multilayer neural network model, and the apparatus includes a processor unit 101, an internal memory unit 102, a network interface unit 103, an input unit 104, an external memory unit 105 and a bus unit 106.

The processor unit 101 may be a CPU or a GPU. The memory unit 102 includes a random access memory (RAM) and a read only memory (ROM). The RAM may be used as a main memory, a work area and the like of the processor unit 101. The ROM may be used to store the control program of the processor unit 101, and additionally, may also be used to store files or other data to be used when the control program is operated. The network interface unit 103 may be connected to the network and carry out network communications. The input unit 104 controls input from devices such as a keyboard, a mouse and the like. The external memory unit 105 stores a startup program, various applications and the like. The bus unit 106 is used to connect each of the units in the apparatus for optimizing the multilayer neural network model.

The embodiments of the present disclosure will be described in detail below with reference to the accompanying drawings.

First Embodiment

As shown in FIG. 4(*b*), it is a schematic flowchart of optimizing a multilayer neural network model in the first embodiment of the present disclosure. In the present embodiment, the processing flow for optimizing the multilayer neural network model shown in FIG. 4(*b*) are carried out by causing the CPU 101 to execute a program (such as a neural network forward prediction algorithm) stored in the ROM and/or the external memory unit 105 through using the RAM as a work memory.

Step S201: a pre-processing step.

Step S201 is pre-processing before execution of optimization of the multilayer neural network model, and the details thereof are: obtaining a multilayer neural network model to be optimized.

It should be noted that step S201 is not a necessary step to achieve the purpose of the present disclosure. The multilayer neural network model that needs to be optimized in step S201 may be a multilayer neural network model modeled by a known method. The binary convolutional neural network model shown in FIG. 1 is an example of the multilayer neural network model that needs to be optimized. The multilayer neural network model obtained in step S201 may be a network model modeled by a known technique, and the embodiment of the present disclosure is not limited thereto.

Step S202: a sub-structure dividing step.

In step S202, the processing for optimizing the multilayer neural network model is started. The details are: dividing out at least one sub-structure from the multilayer neural network model, wherein the tail layer of each of the divided sub-structures is a quantization layer.

If the multilayer neural network model obtained in step S201 is a convolutional neural network model, a convolution layer may further be included in each of the divided sub-structures in order to make the convolution processing to be embodied in the sub-structure. Furthermore, in order to embody the convolution operation better, the head layer of each sub-structure is the convolution layer, and the bottom layer is the quantization layer. There may be other layers between the convolution layer and the quantization layer, such as a batch normalization layer, a pooling layer, a scaling layer and the like. Of course, there may be no other layers between the convolution layer and the quantization layer, that is, only the convolution layer and the quantization layer are included in the sub-structure sequentially. FIGS. 5A to 5D illustrate schematic diagrams of four types of sub-structures. However, in the scheme of the embodiment of the present disclosure, the form of the sub-structure is not limited to the structure shown in FIGS. 5A to 5D, and a sub-structure satisfying the above conditions may be divided out from the multilayer neural network model according to the actual structure of the multilayer neural network model. A detailed example of dividing sub-structures in step S202 will be given later.

Step S203: a data transferring step.

In step S203, the processing of optimizing the multilayer neural network model is continued. The details are: updating the quantization threshold parameters in the quantization layer by using the operation parameters in the layers other than the tail layer (quantization layer) for each of the divided sub-structures, that is, equivalently transferring the operation parameters and the operation procedures in the layers other than the tail layer to the quantization layer to update the quantization threshold parameters in the quantization layer. Note that the "transferring" described in the embodiments of the present disclosure is essentially a merge operation. For example, for a sub-structure containing N layers, the output of each layer is used as the input of the next layer starting from the head layer until transferring to the quantization layer, thereby determining the relationship expressed by mathematical formula between the head layer and the tail layer.

In step S203 of the embodiment of the present disclosure, for each of layers except the tail layer of a sub-structure, the operation parameters and the operation procedures in the upper layer are equivalently transferred to the lower layer from top to bottom, until the operation parameters and the operation procedures in each layer are equivalently transferred to the tail layer (i.e., the quantization layer), thereby updating the quantization threshold parameters in the quantization layer. For the updated quantization threshold parameter, it may reflect the operation parameters and the operation procedures in each layer (i.e., the operation characteristics of each layer) undergone during the data transferring procedure, and when the quantization (mapping) processing is performed by using the updated quantization threshold parameters, the integer may be used as the quantization result of the quantization (mapping) processing without using the selected center point element in a floating-point form in the input feature map from the upper layer as the quantization result as in the formula (3), thereby reducing the processor resources necessary during operation.

A detailed example of the data transferring procedure in step S203 will be given later.

For the multilayer neural network model optimized through the steps S201 to S203, the multilayer operations for any sub-structure in the optimized network model are evolved into the quantization operation of the quantization layer in the sub-structure, and the output from the quantization layer is no longer an operation parameter in a floating-point form, but an operation parameter in an integer form, such that the operation of a layer after this sub-structure (which may be a layer in another sub-structure and may also be a layer in the network model not belonging to the sub-structure) becomes simple, and the optimized multilayer neural network models can be operated by the processor resources occupied less.

In addition to the procedures of the optimization processing in the steps S202 and S203, optimization processing such as sub-structure simplifying processing and fixed-point processing may further be performed on the multilayer neural network model optimized through the steps S202 to S203 in the embodiment of the present disclosure, and the details are shown in the description below.

Step S204: a sub-structure simplifying step.

Figure 4B:
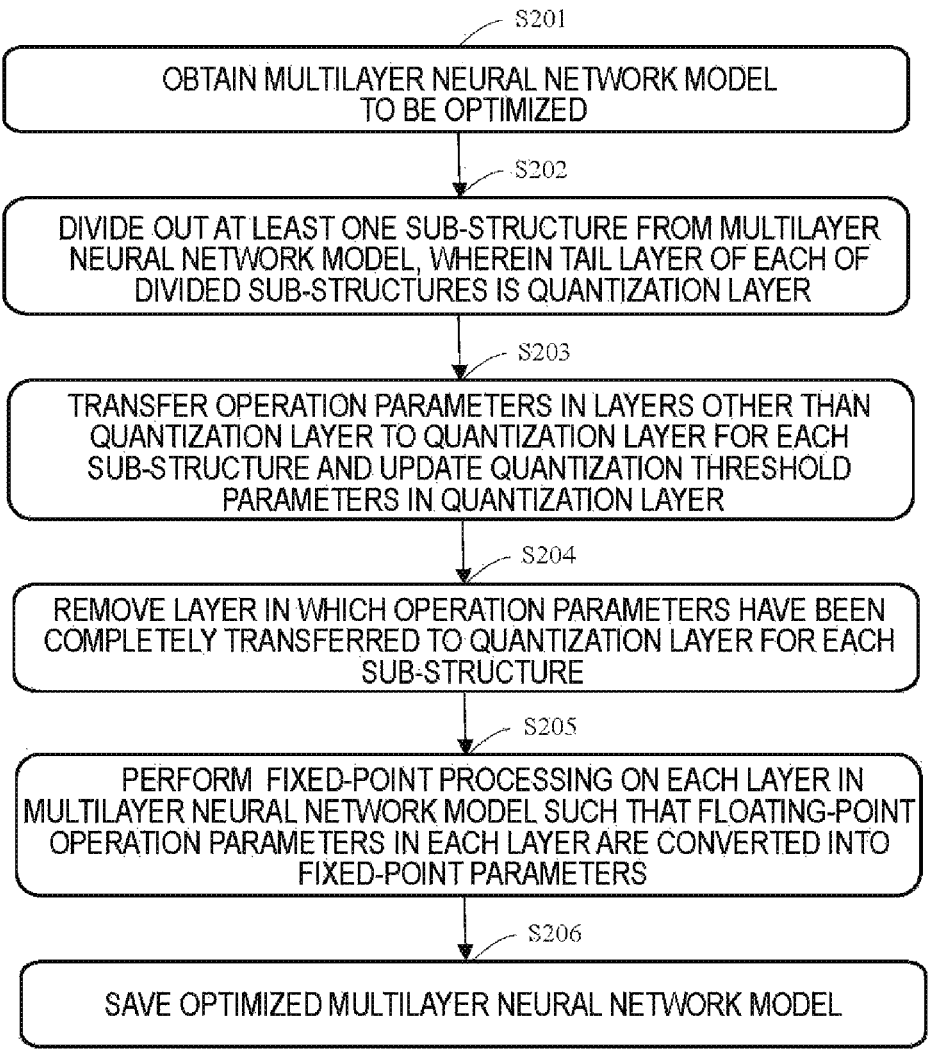

Continuing to refer to FIG. 4(b), the details of the processing of simplifying the sub-structure in step S204 are: for layers other than the tail layer in each sub-structure, removing the layer in which the operation parameters and the operation procedures have been equivalently transferred to the quantization layer from the sub-structure.

In the embodiment of the present disclosure, since there is a layer in which the operation parameters and the operation procedures have been equivalently transferred to the quantization layer completely among the layers other than the tail layer, and data is no longer operated in such layer when the multilayer neural network model is operated, it will not result in a negative impact on the operation accuracy even if such layer is removed. Instead, the structure of the multilayer neural network model will be made simpler. A detailed example of simplifying the sub-structure in step S204 will be given later.

Step S205: a fixed-point step.

Continuing to refer to FIG. 4(b), the details of the fixed-point processing in step S205 are: performing fixed-point processing on each layer in the multilayer neural network model such that the floating-point operation parameters in each layer are converted into fixed-point parameters. An optional technique of fixed-point processing is a Q-value technique, wherein the Q value is a positive integer N and means that the floating-point number is rounded after being shifted to the left by N bits (an amplification operation, which is equivalent to multiplying by the Nth power of 2), thereby converting the floating-point operation parameters into fixed-point parameters (integer). Depending on the accuracy requirement on the multilayer neural network model, one N value may be set for the multilayer neural network model, and N values may be set with respect to different layers, respectively. A detailed example of the fixed-point in step S205 will be given later.

Note that step S205 may be performed after the processing of steps S203 and S204 are completed. Of course, step S205 may also be performed before step S203, for example, performed between step S201 and step S202, or performed between step S203 and step S204. The embodiment of the present disclosure does not limit the processing time point of step S205, as long as the floating-point operation parameters in each layer of the multilayer neural network model can be converted into fixed-point numbers. In addition, the steps S204 and S205 are steps in the embodiment of the present disclosure. In the embodiment of the present disclosure, the two steps may exist at the same time, one of them may exist, or neither of them exists.

Step S206: a saving step.

The details of the saving step in step S206 are: saving the multilayer neural network model optimized through the previous steps S202 to S205. Preferably, if the multilayer neural network model is a binary convolutional neural network model, the Weights in the binary convolution layer may be saved in a form of binary streams. Meanwhile, since each of layers in the sub-structure has equivalently transferred the operation parameters and the operation procedures in such layer to the quantization layer in step S203, the operation parameters in these layers will not be included in the network model.

Note that this saving step is an optional step of the embodiment of the present disclosure. In the scheme of the embodiment of the present disclosure, the saving step may not be performed, and the optimized multilayer neural network model is directly outputted to outside through a network interface or other input/output interfaces.

Note that the optimization processing described in steps S202 to S205 in the present embodiment may be performed a plurality of times, that is, even if all the optimization processing procedures in steps S202 to S205 have been performed and after the optimized multilayer neural network model is saved in step S206, the optimization processing in steps S202 to S205 may be performed on the saved network model again, thereby improving the operation accuracy of the network model.

The steps S202 to S205 are described in detail below by specific examples.

<Example of Dividing Sub-Structures in Step S202>

Taking the case that the binary convolutional neural network model shown in FIG. 1 is obtained in step S201 as an example, in step S202, the procedure of dividing sub-structures from this network model is specifically described as follows.

Figure 2A:
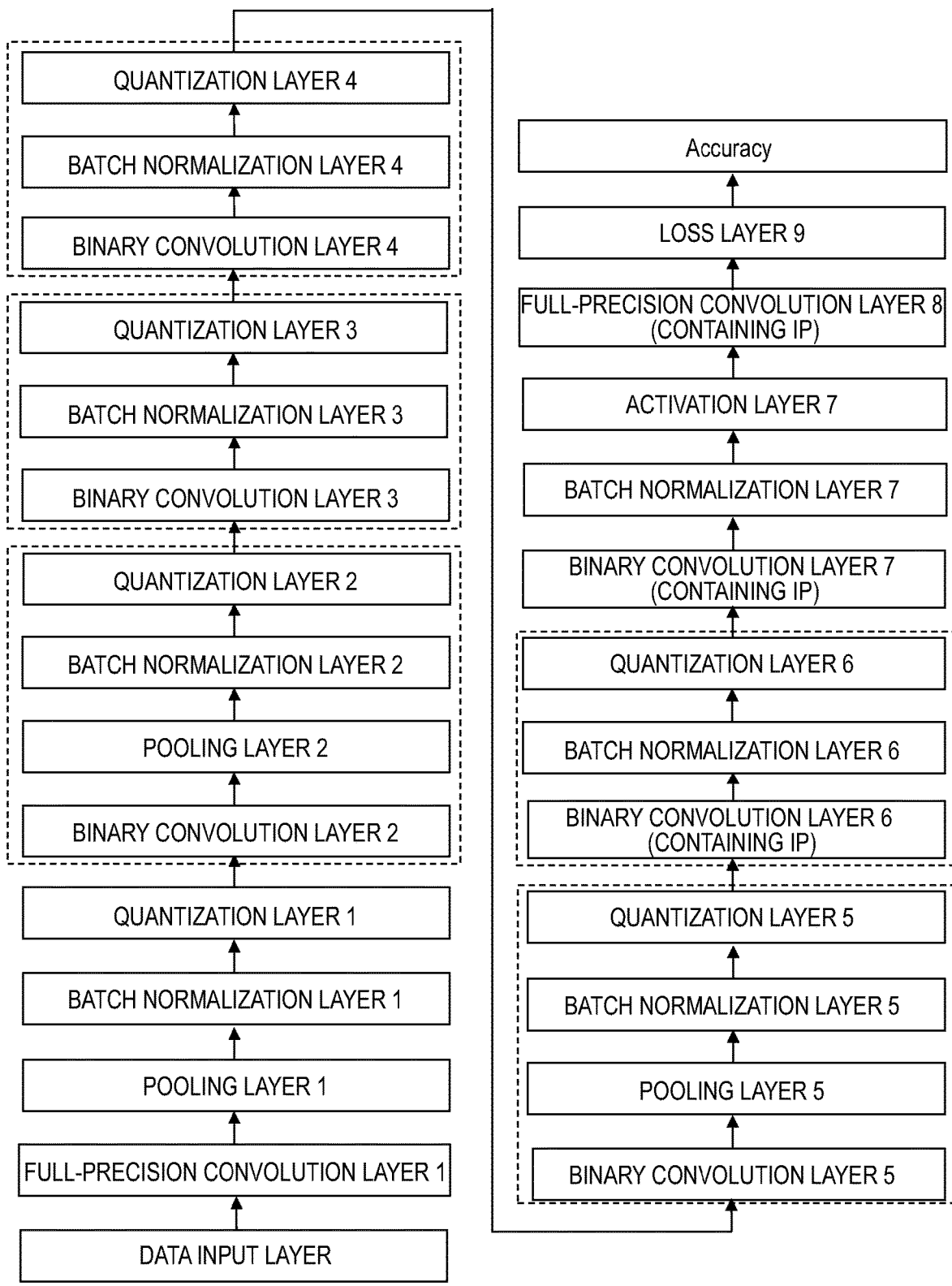
FIG. 2A shows an example of a network model for dividing sub-structures of the network model shown in FIG. 1, FIGS. 2B and 2C are examples of a part of the sub-structures in FIG. 2A respectively.
Figures 2B, 2C:
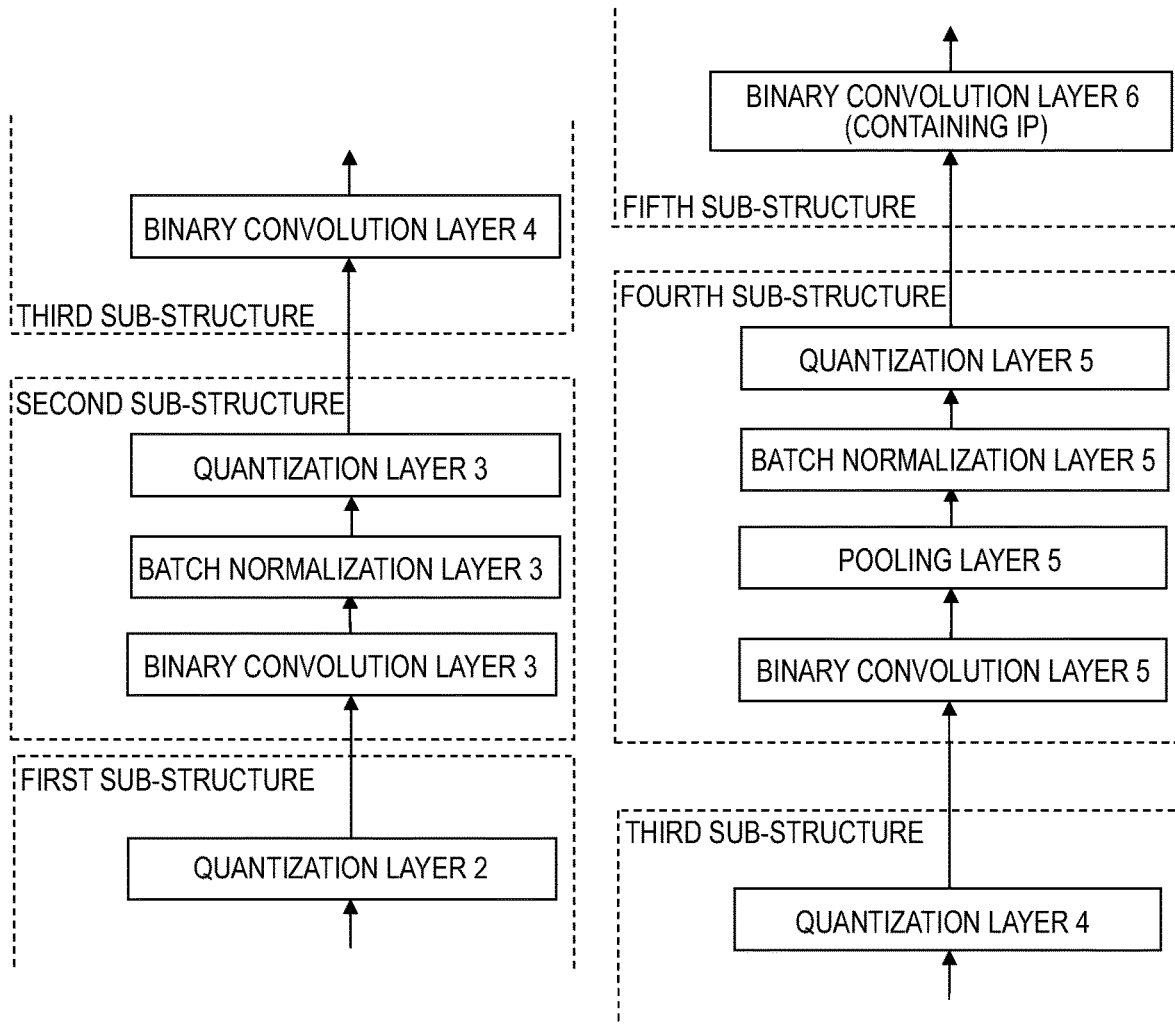
FIG. 2D is an example of the network model after simplifying FIG. 2A.

Referring to FIG. 1, eight convolution layers are included in the binary convolutional neural network models. In order to ensure the accuracy of this network model, both of the head and tail convolution layers may be set as a full-precision convolution layer (i.e., a convolution layer that is not binarized), and the remaining convolution layers are binary convolution layers that have been binarized. It is assumed that the dividing principle of the sub-structure is that the head layer is a binary convolution layer, and the tail layer is a quantization layer. Five sub-structures may be divided out from the model shown in FIG. 1, and FIG. 1 in which the sub-structures are divided becomes to the structure shown in FIG. 2A in which each dashed block represents a sub-structure. Wherein the head layer of the first sub-structure is a binary convolution layer 2, the middle layers are a pooling layer 2 and a batch normalization layer 2 sequentially, and the tail layer is a quantization layer 2; the head layer of the second sub-structure is a binary convolution Layer 3, the middle layer is a batch normalization layer 3, and the tail layer is a quantization layer 3; the head layer of the third sub-structure is a binary convolution layer 4, the middle layer is a batch normalization layer 4, and the tail layer is a quantization layer 4; the head layer of the fourth sub-structure is a binary convolution Layer 5, the middle layers are a pooling layer 5 and a batch normalization layer 5 sequentially, and the tail layer is a quantization layer 5; and the head layer of the fifth sub-structure is a binary convolution layer 6, the middle layer is a batch normalization layer 6, and the tail layer is a quantization layer 6. FIGS. 2B and 2C show a part of the network model from FIG. 2A in which the sub-structures are divided.

In order to simplify the description of the network model, each of layers of the multilayer neural network model may be assigned with different character identifiers according to Table 1.

TABLE 1

| Layer | Character Identifier |
| --- | --- |
| Data input Layer | D |
| Full-precision Convolution Layer (Containing IP) | F |
| Binary Convolution Layer (Containing IP) | C |
| Pooling Layer | P |
| Batch normalization Layer | B |

TABLE 1-continued

| Layer | Character Identifier |
|---|---|
| Quantization Layer | Q |
| Activation Layer (ReLU) | R |
| Loss layer (Softmax WithLoss) | S |
| Accuracy | A |

Wherein IP represents a fully connected layer in which each neuron connects to all input nodes. Based on the correspondence relationship between the layer and the character identifier shown in Table 1, the binary convolutional neural network model shown in FIG. 2A may be expressed as a character sequence as shown below.

D→F→P→B→Q→C→P→B→Q→C→B→Q→C→B→Q→C→P→B→Q→C→B→Q→C→B→Q→C→B→R→F→S→A

Referring to the above divided five sub-structures, it can be seen that the sub-sequences CPBQ and the sub-sequences CBQ in the character sequence represent the divided sub-structures. Therefore, by using a method such as regular matching sub-string search, the divided five sub-structures may be expressed in the above character sequence as the following form.

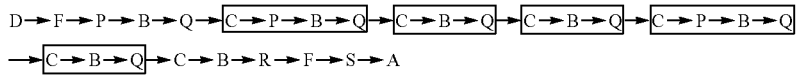

In addition, since the network model is operated layer by layer from top to bottom, in order to ensure the correct operation order of the network model, there should be no nesting between each of the divided sub-structures. For example, when there is a sub-sequence such as C→C→B→Q→B→Q in the network model, it needs to divide the sub-structures in the manner (no nesting) that the character sub-sequence C→B→Q in the middle is expressed as a sub-structure, and C and B→Q at both ends do not constitute a sub-structure.

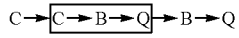

A problem that the operation is erroneous will occur if the sub-structure is divided in accordance with the following manner (with nesting).

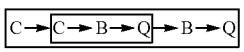

<Example of Transferring Data in Step S203>

Figure 5A:
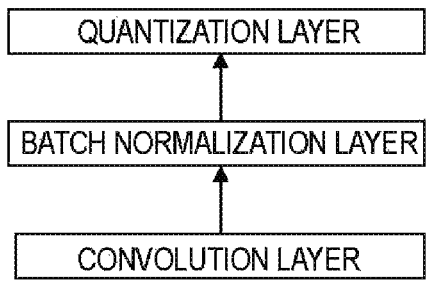
FIGS. 5A to 5D show examples of four types of sub-structures.
Figure 5B:
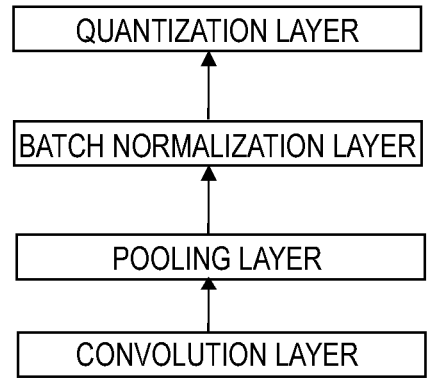
Figure 5C:
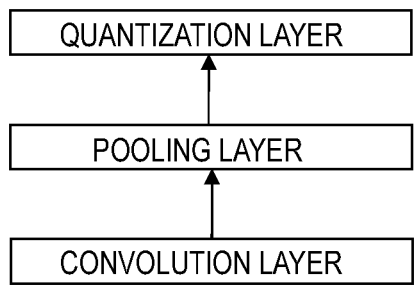
Figure 5D:
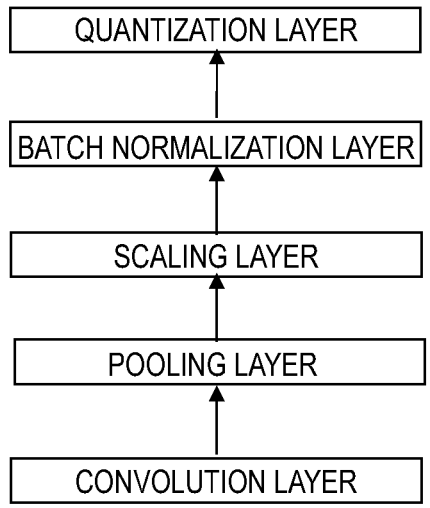

Taking the sub-structure shown in FIG. 5A as an example, this sub-structure includes a convolution layer, a batch normalization layer and a quantization layer from top to bottom. In the convolution layer, the operation result $Y_1$ is output to the batch normalization layer after the operation shown in the formula (2) is performed by using the input feature map (i.e., the output in the upper layer of the convolution layer) $X_1$ input to the convolution layer. In the batch normalization layer, the received $Y_1$ undergoes batch normalization processing, and the output after the batch normalization processing is equivalently transferred to the quantization layer. Then, in the quantization layer, the quantization threshold parameters in the formula (4) are updated by using the input feature map from the batch normalization layer. The sub-structures shown in FIGS. 5B to 5D may be regarded as a modification of the sub-structure in FIG. 5A, and their transferring procedures are similar to the above procedure. For example, compared with the sub-structure in FIG. 5A, a pooling layer is added between the convolution layer and the batch normalization layer in the sub-structure shown in FIG. 5B. In the sub-structure shown in FIG. 5B, the manner of transferring operation result is consistent with the manner based on the sub-structure of FIG. 5A since the pooling operation itself does not require any parameters. Compared with the sub-structure in FIG. 5A, the batch normalization layer is cancelled and the pooling layer is added in the sub-structure shown in FIG. 5C, and the operation result $Y_1$ of the convolution layer is directly input into the quantization layer since the pooling operation itself does not require any parameters. Compared with the sub-structure in FIG. 5A, the pooling layer and the scaling layer are added sequentially between the convolution layer and the batch normalization layer in the sub-structure of FIG. 5D, and the operation output $Y_1$ in the convolution layer is transferred to the scaling layer through the pooling layer. In the scaling layer, a scaling operation is performed by using the input $Y_1$, then the output result is transferred to the batch normalization layer. Finally, in the batch normalization layer, batch normalization processing is performed by using the result output from the scaling layer, and the result after the batch normalization processing is transferred to the quantization layer.

The specific algorithm for transferring and updating the quantization threshold parameters is described still by taking the sub-structure shown in FIG. 5A as an example. It is assumed that, before performing the step S203, the output of the convolution layer may be calculated as $Y_1=(W_b \otimes X_1)* \alpha+b=\alpha\beta \cdot W_b \otimes X_q$ b based on the formula (2). Wherein β is a non-zero minimum term parameter in the input feature map of the quantization convolution layer, and $X_q$ is a representation of the integer part of the feature map. The output of the convolution layer is transferred to the batch normalization layer to perform the batch normalization processing, and the procedure of the batch normalization processing may be expressed by the following formula (5).

$$Y_2=(X_2-\theta)/\sigma \quad (5)$$

Wherein θ is a mean parameter of the batch normalization layer; σ is a variance parameter of the batch normalization layer, and θ and σ are numerical values of the floating-point type; $X_2$ is an output (i.e., $Y_1$) of the convolution layer transferred to the batch normalization layer, and $Y_2$ is an output of the batch normalization layer to the quantization layer. The batch normalization processing is processing of normalizing the input feature map into a standard normal distribution form.

Further, it is assumed that the quantization (mapping) procedure in the quantization layer is expressed by the formula (4), and the feature map output by the batch normalization layer to the quantization layer are $Y_2$ and each of elements in the feature map is $X_i$. Next, the execution procedure of updating the quantization threshold parameters in the quantization layer in step S203 will be described in detail.

The quantization layer quantizes the input feature map by 2 bits, and the quantization (mapping) procedure in the quantization layer may be evolved from the formula (4) into the formula (6).

$$Y_i = \begin{cases} 0, & \text{if } X_i \leq thr_1 \\ \beta', & \text{if } thr_1 < X_i \leq thr_2 \\ 2\beta', & \text{if } thr_2 < X_i \leq thr_3 \\ 3\beta', & \text{if } thr_3 < X_i < \infty \end{cases} \quad (6)$$

Wherein $\beta'=0.538$, $thr_1=0$, $thr_2=0.807$, $thr_3=1.345$, $X_i$ is the i-th element in the input feature map output by the batch normalization layer to the quantization layer, and $Y_i$ is an output of the quantization layer for the i-th element in the input feature map.

It can be seen that from the combination of the formula (2) and the formula (5), the $Y_1$ in the formula (2) is the $X_2$ in the formula (5), and the $Y_2$ in the formula (5) is the input feature map in the formula (6) input to the quantization layer by the batch normalization layer, wherein the i-th element is $X_i = ((\alpha\beta \cdot W_b \otimes X_q b) - \theta)/\sigma$. Therefore, the above formula (6) may be further evolved into the formula (7).

$$Y = \begin{cases} 0, & \text{if } \dfrac{\alpha\beta \cdot W_b \otimes X_q + b - \theta}{\sigma} \leq thr_1 \\ \beta', & \text{if } thr_1 < \dfrac{\alpha\beta \cdot W_b \otimes X_q + b - \theta}{\sigma} \leq thr_2 \\ 2\beta', & \text{if } thr_2 < \dfrac{\alpha\beta \cdot W_b \otimes X_q + b - \theta}{\sigma} \leq thr_3 \\ 3\beta', & \text{if } thr_3 < \dfrac{\alpha\beta \cdot W_b \otimes X_q + b - \theta}{\sigma} < \infty \end{cases} \quad (7)$$

The formula (7) may be continued to be evolved into the formula (8) through mathematical transformation.

$$Y = \begin{cases} 0, & \text{if } (W_b \otimes X_q) \leq \dfrac{(thr_1 * \sigma + \theta - b)}{\alpha\beta} \\ \beta', & \text{if } \dfrac{(thr_1 * \sigma + \theta - b)}{\alpha\beta} < (W_b \otimes X_q) \leq \dfrac{(thr_2 * \sigma + \theta - b)}{\alpha\beta} \\ 2\beta', & \text{if } \dfrac{(thr_2 * \sigma + \theta - b)}{\alpha\beta} < (W_b \otimes X_q) \leq \dfrac{(thr_3 * \sigma + \theta - b)}{\alpha\beta} \\ 3\beta', & \text{if } \dfrac{(thr_3 * \sigma + \theta - b)}{\alpha\beta} < (W_b \otimes X_q) < \infty \end{cases} \quad (8)$$

The formula (8) may be continued to be evolved into the formula (9) through mathematical transformation again.

$$Y = \beta' * \begin{cases} 0, & \text{if } (W_b \otimes X_q) \leq \dfrac{(thr_1 * \sigma + \theta - b)}{\alpha\beta} \\ 1, & \text{if } \dfrac{(thr_1 * \sigma + \theta - b)}{\alpha\beta} < (W_b \otimes X_q) \leq \dfrac{(thr_2 * \sigma + \theta - b)}{\alpha\beta} \\ 2, & \text{if } \dfrac{(thr_2 * \sigma + \theta - b)}{\alpha\beta} < (W_b \otimes X_q) \leq \dfrac{(thr_3 * \sigma + \theta - b)}{\alpha\beta} \\ 3, & \text{if } \dfrac{(thr_3 * \sigma + \theta - b)}{\alpha\beta} < (W_b \otimes X_q) < \infty \end{cases} \quad (9)$$

In the above formula (9), making $$thr'_1 = \frac{(thr_1 * \sigma + \theta - b)}{\alpha\beta}, \quad thr'_2 = \frac{(thr_2 * \sigma + \theta - b)}{\alpha\beta},$$

and $$thr'_3 = \frac{(thr_3 * \sigma + \theta - b)}{\alpha\beta},$$

then the above formula (9) may be evolved into the formula (10).

$$Y = \beta' * \begin{cases} 0, & \text{if } (W_b \otimes X_q) \leq thr'_1 \\ 1, & \text{if } thr'_1 < (W_b \otimes X_q) \leq thr'_2 \\ 2, & \text{if } thr'_2 < (W_b \otimes X_q) \leq thr'_3 \\ 3, & \text{if } thr'_3 < (W_b \otimes X_q) \leq \infty \end{cases} \quad (10)$$

The formula (10) shows the result of updating the quantization threshold parameters after the operation parameters and the operation procedures in each of layers above the quantization layer are equivalently transferred to the quantization layer. At this time, the updated quantization threshold parameters reflect the operation parameters and the operation procedures in the convolution layer and the batch normalization layer. Moreover, the result corresponding to the quantization (mapping) processing is the product of the non-zero minimum term parameter and the integer 0, 1, 2 or 3. Wherein ($W_b \otimes X_q$) denotes the output of the convolution layer which is irrelevant to the scaling and offset parameters of the convolution filter.

Comparing the formula (6) with the formula (10), it can be seen that the input feature map input to the quantization layer are changed from $X_i$ which is related to the convolution operation of the convolution layer and the batch normalization operation of the batch normalization layer to the output $W_b \otimes X_q$ of the convolution layer which is irrelevant to the scaling and offset parameters of the convolution filter. At the same time, the quantization threshold parameters in the quantization layer are changed from $thr_1$ to $thr_1'$, from $thr_2$ to $thr_2'$, and from $thr_3$ to $thr_3'$. That is, the quantization threshold parameters in the formula (6) determined by the operation of the center point element in the input feature map are changed to the quantization threshold parameters determined by the center point elements ($thr_1 \sim thr_3$ and $\beta'$), the operation parameters in the convolution layer (the scaling coefficient $\alpha$ of the binarized Weights convolution filter, the non-zero minimum term parameter $\beta$ quantized by the input feature map, and the offset parameter b of the convolution operation), and the operation parameters in the batch normalization layer (the mean parameter $\theta$ of the batch normalization layer and the variance parameter $\sigma$ of the batch normalization layer). By reflecting the operation parameters and the operation procedures in the convolution layer and the batch normalization layer in the quantization threshold parameters in the quantization layer, the equivalent transferring of the operation parameters and the operation procedures in the convolution layer and the batch normalization layer to the quantization layer is realized, and at this time, the quantization layer may directly quantize (map) each of elements in the input feature map to 0, 1, 2, or 3 and output it. At the same time, its non-zero minimum term parameter β' may also be output for subsequent fixed-point.

In addition, referring to the formula (10), it can be seen that, in the case where $W_b$ and $X_q$ are integers respectively, that is, $(W_b \otimes X_q)$ is an integer, and one or more of $thr_1'$ to $thr_3'$ is/are floating-point numbers, the rounded off floating-point portion does not affect the threshold comparison result after rounding processing of rounding off the floating-point is performed on the floating-point numbers in $thr_1'$ to $thr_3'$, that is, the quantization result before and after the rounding is lossless. Therefore, by the simply rounding processing of rounding off the floating-point, the formula (10) may be converted into an integer quantization operation in a case of lossless conversion.

With the scheme of the first embodiment, especially by the expression of the formula (10), it can be seen that the parameters used when the corresponding operations are performed in each layer of the network model, such as the scaling coefficient α in the convolution layer, are not directly stored in the form of weights, but are stored in the form of quantization threshold parameters after the operation parameters and the operation procedures of each layer above the quantization layer are equivalently transferred to the quantization layer, thereby reducing the storage space when these parameters are stored.

Taking the scaling coefficient α as an example, in general, α is a floating-point number, and the parameter $W_b = \{1, -1, 1, \ldots 1, -1\}$ of the convolution filter represented with the binary weights is an integer. When a conventional method is used to store the original parameter W ($W = W_b * \alpha$) of the convolution filter, it needs to store $W_b$ and α respectively. However, after the scheme of the first embodiment of the present disclosure is adopted, especially after the evolution of the formula (10), α is transferred to the quantization threshold parameters of the quantization layer. In this way, only $W_b = \{1, -1, 1, \ldots 1, -1\}$ is needed to be stored, without needing to store α. Thus, the space for storing the operation parameters of the convolution layer of the network model can be effectively reduced and the storage resources can be saved.

In the conventional method, if it is desired to store the original parameter W with a low bit (e.g., 1 bit), it is difficult to include a in the original parameter W with the low bit, and it is difficult to use a during operation of the network model. However, after the scheme of the first embodiment of the present disclosure is adopted, especially after the evolution of the formula (10), α is transferred to the quantization threshold parameters of the quantization layer. In this way, even if a is not included in the original parameter W stored in the form of low bit, the transferred α may also be used in the form of quantized threshold parameter during the operation of the network model, thereby improving the accuracy of the network model.

Note that the operation procedures of the formula (6) to the formula (10) are described by taking the sub-structure in FIG. 5A as an example, and the embodiment of the present disclosure is not limited to other sub-structures. For different sub-structures, the algorithms and results of updating the quantization threshold parameters are also different when the operation parameters and the operation procedures in each of layers are equivalently transferred to the quantization layer from top to bottom so as to update the quantization threshold parameters. The embodiment of the present disclosure does not limit the update algorithm of the quantization threshold parameters for the specific sub-structure, as long as the sub-structure described in the embodiment of the present disclosure is satisfied and the operation parameters and the operation procedures in each of the layers above the quantization layer are transferred sequentially according to the manner described in step S203 until they are transferred to the quantization layer.

Preferably, in consideration of the relationship in the formula (4) between the quantization threshold parameters when the transferring step is not performed, the formula (4) may be evolved into the formula (11).

$$Y_i = \begin{cases} 0, & \text{if } X_i \leq 0 \\ \beta', & \text{if } 0 < X_i \leq 1.5\beta \\ 2\beta', & \text{if } 1.5\beta < X_i \leq 2.5\beta \\ 3\beta', & \text{if } 2.5\beta < X_i < \infty \end{cases} \quad (11)$$

Assuming that after the formula (4) is evolved into the formula (11) and then the formula (11) is evolved according to the same algorithm as that of the formula (7) to the formula (9), the formula (12) is obtained.

$$Y_i = \beta' * \begin{cases} 0, & \text{if } (W_b \otimes X_q) \leq \frac{(0*\sigma+\theta-b)}{\alpha\beta} \\ 1, & \text{if } \frac{(0*\sigma+\theta-b)}{\alpha\beta} < (W_b \otimes X_q) \leq \frac{(1.5\beta*\sigma+\theta-b)}{\alpha\beta} \\ 2, & \text{if } \frac{(1.5\beta*\sigma+\theta-b)}{\alpha\beta} < (W_b \otimes X_q) \leq \frac{(2.5\beta*\sigma+\theta-b)}{\alpha\beta} \\ 3, & \text{if } \frac{(2.5\beta*\sigma+\theta-b)}{\alpha\beta} < (W_b \otimes X_q) < \infty \end{cases} \quad (12)$$

Further, the formula (12) may be evolved into the formula (13).

$$Y_i = \beta' * \begin{cases} 0, & \text{if } (W_b \otimes X_q) \leq \frac{\theta-b}{\alpha\beta} \\ 1, & \text{if } \frac{\theta-b}{\alpha\beta} < (W_b \otimes X_q) \leq \frac{1.5\beta*\sigma}{\alpha\beta} + \frac{\theta-b}{\alpha\beta} \\ 2, & \text{if } \frac{1.5\beta*\sigma}{\alpha\beta} + \frac{\theta-b}{\alpha\beta} < (W_b \otimes X_q) \leq \frac{2.5\beta*\sigma}{\alpha\beta} + \frac{\theta-b}{\alpha\beta} \\ 3, & \text{if } \frac{2.5\beta*\sigma}{\alpha\beta} + \frac{\theta-b}{\alpha\beta} < (W_b \otimes X_q) < \infty \end{cases} \quad (13)$$

In the formula (13), making $$\frac{\beta*\sigma}{\alpha*\beta}$$

a base coefficient $$\gamma, \frac{\theta-b}{\alpha*\beta}$$

be a shift coefficient δ, then the formula (13) may be simplified to the formula (14).

$$Y_i = \beta' * \begin{cases} 0, & \text{if } (W_b \otimes X_q) \leq \delta \\ 1, & \text{if } \delta < (W_b \otimes X_q) \leq 1.5\gamma + \delta \\ 2, & \text{if } 1.5\gamma + \delta < (W_b \otimes X_q) \leq 2.5\gamma + \delta \\ 3, & \text{if } 2.5\gamma + \delta < (W_b \otimes X_q) < \infty \end{cases} \quad (14)$$

Referring to the formula (14), it can be seen that the quantization threshold parameters updated after the transferring step may be expressed by one base coefficient γ, one shift coefficient δ and the correlation relationship between different quantization threshold parameters with respect to the base coefficient γ. Therefore, when the updated quantization threshold parameters are saved, only the base coefficient γ, the shift coefficient δ and the correlation relationship between the quantization threshold parameters with respect to the base coefficient γ may be saved and it is unnecessary to save all the quantization threshold parameters sequentially, thereby saving the storage space.

Since the expression form of the above formula (14) may be changed by a simple mathematical transformation, the embodiment of the present disclosure does not specifically limit γ, δ, and the correlation relationship between the quantization threshold parameters with respect to the base coefficient γ in the above formula (14). For example, 1.5γ in the formula (14) is expressed as γ+0.5γ, and 2.5γ is expressed as 2γ+0.5γ, then 1.5γ+δ in the formula (14) may be expressed as γ+0.5γ+δ=γ+δ', and 2.5γ+δ may be expressed as 2γ+0.5γ+δ=2γ+δ', wherein δ'=0.5γ+δ. In this way, the above formula (14) may be converted into a new formula expressed by γ and δ'.

Note that, since the formula (4) is explained by taking, as an example, the cases where the quantization threshold parameters are determined in the manner of using four numbers (0, 0.538, 1.076, and 1.614) as the selected center point elements and averaging the selected center point elements, and each element in the input feature map from the upper layer of the quantization layer is quantized (mapped) to the numerical space expressed by k=2 bits, four kinds of results (i.e., 0, 1, 2, or 3) can be output in the formula (14), and there are multiple relationship (i.e., 1.5 and 2.5 times) between the quantization threshold parameter and the non-zero minimum term β'. However, if the quantization threshold parameters are determined in other manners in the formula (4) and the value of k is a value other than 2, the correlation relationship between the quantization threshold parameters in the evolved formula (11) to formula (14) will changes accordingly. For example, the formula (15) that covers a wider range compared with the formula (14) may be obtained.

$$Y_i = \beta' * \begin{cases} 0, & \text{if } (W_b \otimes X_q) \leq thr''_1 \\ 1, & \text{if } thr''_1 < (W_b \otimes X_q) \leq thr''_2 \\ 2, & \text{if } thr''_2 < (W_b \otimes X_q) \leq thr''_3 \\ \ldots \\ 2^k - 1, & \text{if } thr''_{2^k-1} < (W_b \otimes X_q) < \infty \end{cases} \quad (15)$$

Wherein k denotes that the numerical space for quantization (mapping) is expressed by k bits; $thr''_1$ to $thr''_{2^k-1}$ represent a simplified expression that embodies the correlation relationship between thresholds in the case of using a certain central element selecting method and a certain quantization threshold parameter determining method.

However, it should be understood that no matter what method is used in the formula (4) to determine the quantization threshold parameters, the methods shown in the formula (11) to the formula (14) may be used to simplify the quantization threshold parameters as long as there is a correlation relationship between the quantization threshold parameters, thereby saving the storage space.

It should be understood that the formula (14) is substantially the same as the formula (10), and they are explained herein in two different expression forms. The embodiment of the present disclosure is not limited to other modifications in the formula (14) and the formula (10).

<Example of Simplifying Sub-Structure in Step S204>

Still taking the sub-structure shown in FIG. 5A as an example, after the operation parameters and the operation procedures in the convolution layer and the batch normalization layer are equivalently transferred to the quantization layer just as expressed by the formula (10), on one hand, the batch normalization layer may be removed from the sub-structure since the operation parameters and the operation procedures in the batch normalization layer have been equivalently transferred to the quantization layer completely, and on the other hand, although the scaling and offset parameters of the convolution filter of the convolution layer have also been transferred to the quantization layer, the convolution layer cannot be removed since the convolution layer still performs the operation $(W_b \otimes X_q)$ that is irrelevant to the scaling and offset parameters of the convolution filter. After the processing of simplifying the sub-structure in the step S204, the structure of the multilayer neural network model may be greatly simplified. Based on the above simplified principle, the binary convolutional neural network model shown in FIG. 2A may be changed to the simplified structure shown in FIG. 2D, in which the quantization layer in the sub-structure becomes a joint quantization layer.

Note that the sub-structure shown in FIG. 5A is taken as an example for description, and the embodiment of the present disclosure does not make limitations for the specific sub-structure. As long as it is a layer in which the operation parameters and the operation procedures in the sub-structure are completely transferred to the quantization layer, such layer may be removed from the sub-structure.

<Example of Fixed-Point in Step S205>

An example of the fixed-point processing in the embodiment of the present disclosure is described by taking the Q-value technique as an example. Assuming that the Q value is respectively set for each layer of the binary convolutional neural network model undergone simplifying processing shown in FIG. 2D, the specific fixed-point procedure is as follows.

Figure 2D:
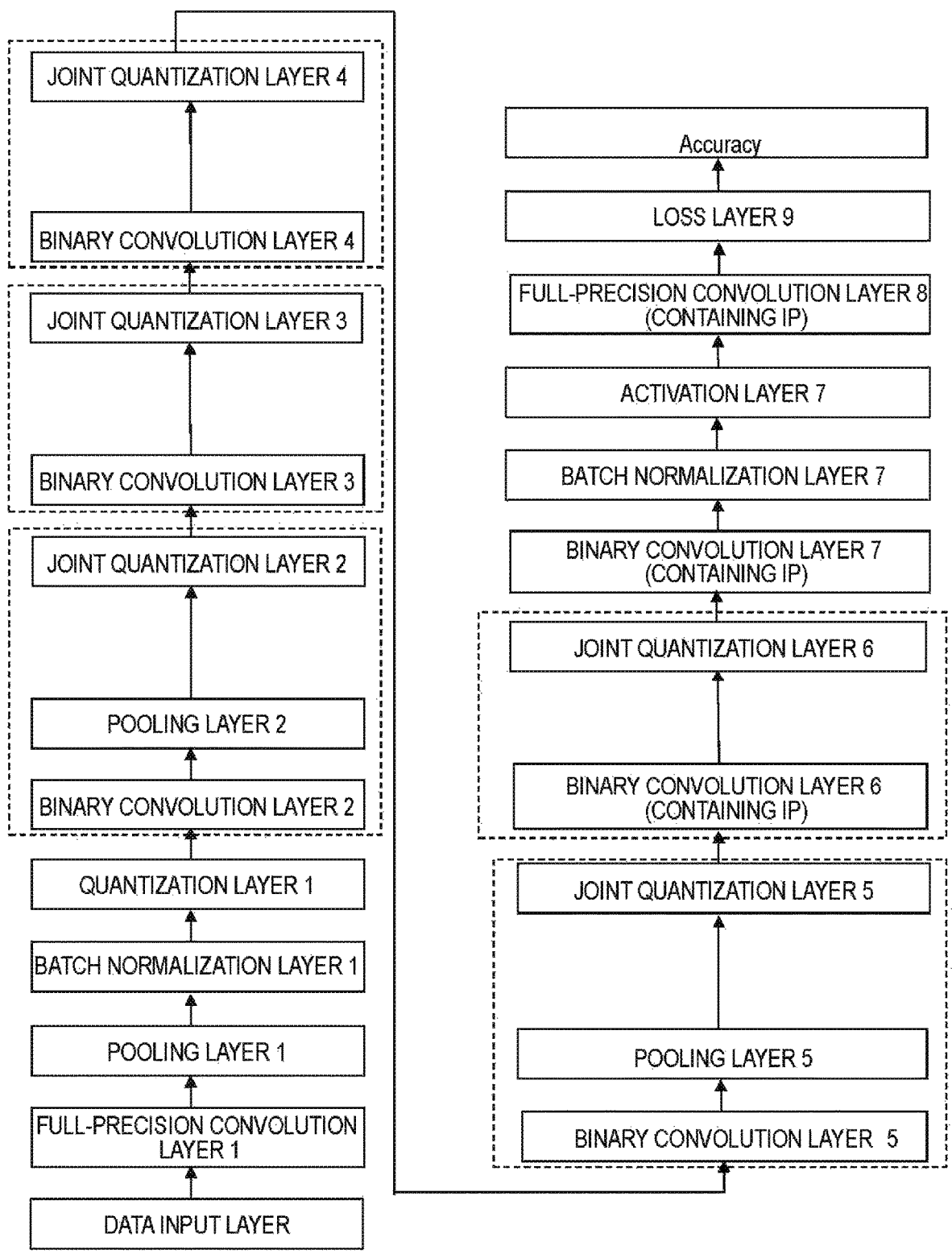

Since the five sub-structures in the network model shown in FIG. 2D have undergone the joint quantization processing based on data transferring in step S203 and the sub-structure simplifying processing in step S204, and the operation parameters in the binary convolution layer 2 to the binary convolution layer 7 in the network model are integers, the Q value for the binary convolution layer 2 to the binary convolution layer 7 may be 1; and since the operation parameters in the other layers are still floating-point numbers, the Q value for the full-precision convolution layer 1 and the quantization layer 1 is 9, and the Q value for the full-precision convolution layer 8 is 13, thereby the operation parameters in each of layers in the model shown in FIG. 2D are all converted into fixed-point parameters. Table 2 is a Q value table designed for the network model shown in FIG. 2D.

TABLE 2

| Layer | Q Value |
| --- | --- |
| Full-precision Convolution Layer 1 | 9 |
| Quantization Layer 1 | 9 |
| Binary Convolution Layer 2 | 1 |
| Joint Quantization Layer 2 | 1 |
| Binary Convolution Layer 3 | 1 |
| Joint Quantization Layer 3 | 1 |
| Binary Convolution Layer 4 | 1 |
| Joint Quantization Layer 4 | 1 |
| Binary Convolution Layer 5 | 1 |
| Joint Quantization Layer 5 | 1 |
| Binary Convolution Layer 6 (Containing IP) | 1 |
| Joint Quantization Layer 6 | 1 |
| Binary Convolution Layer 7 (Containing IP) | 1 |
| Full-precision Convolution Layer 8 (Containing IP) | 13 |

Effect of First Embodiment

Figure 6:
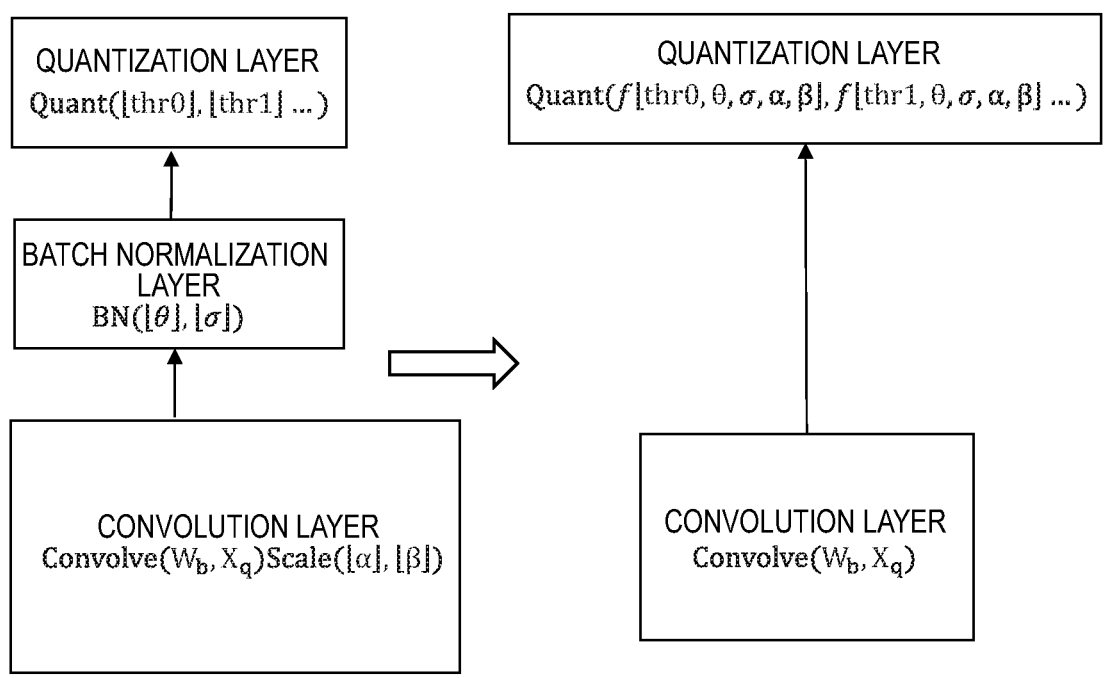
FIG. 6 shows a part of operation procedures of the multilayer neural network model without using an optimization method of the embodiment of the present disclosure, and a part of operation procedures of the multilayer neural network model using the optimization method of the embodiment of the present disclosure.

The left side of FIG. 6 shows a part of the operation procedures of the partial multilayer neural network model without use of the optimization method of the embodiment of the present disclosure, and the right side shows a part of the operation procedures of the multilayer neural network model with use of the optimization method of the embodiment of the present disclosure. In order to facilitate understanding, the operation in the convolution layer on the left side is expressed by Convolve($W_b$, $X_q$) and Scale($\lfloor \alpha \rfloor$, $\lfloor \beta \rfloor$), of which the meanings are equivalent to the formula (2), and wherein Convolve means a convolution operation, and $\beta$ and $X_q$ are respectively equivalent to the representation of the non-zero minimum term parameter and the integer part quantized by the $X_1$ in the formula (2); the operation in the batch normalization layer is expressed by BN($\lfloor \theta \rfloor$, $\lfloor \sigma \rfloor$), of which the meaning is equivalent to the formula (5), and wherein BN means a batch normalization operation; the operation in the quantization layer is expressed by Quant ($\lfloor thr_0 \rfloor$, $\lfloor thr_1 \rfloor$ . . . ), of which the meaning is equivalent to the formula (6), and wherein $thr_0$, $thr_1$ . . . are the quantization threshold parameters in the formula (6) and Quant means a quantization operation. After the optimization scheme of the embodiment of the present disclosure, the operation in the convolution layer on the right side is irrelevant to the scaling and offset parameters of the convolution filter and may be expressed by Convolve($W_b$, $X_q$); the batch normalization operation is omitted, and the operation in the quantization layer is expressed by Quant(f$\lfloor thr_0$, $\theta$, $\sigma$, $\alpha$, $\beta \rfloor$, f$\lfloor thr_1$, $\theta$, $\sigma$, $\alpha$, $\beta \rfloor$ . . . ).

In the scheme based on the first embodiment, the quantization threshold parameters in the quantization layer are updated by dividing sub-structures from the multilayer neural network model and transferring the operation parameters and the operation procedures in each of layers to the tail quantization layer from top to bottom in each of sub-structures, such that the quantization layer quantizes (maps) the elements in the input feature map to integers. When the optimized network model is applied, the operation procedures in the optimized network model, compared with the operation procedures in the conventional network model, may effectively reduce the necessary server resources and save the memory space, and may also save the storage space of the network model at the same time, which makes it possible to operate a multilayer neural network model in an embedded device. Further, in the scheme of the embodiment, the simplifying processing and the fixed-point processing may be further performed on the network model, and when the further optimized network model is applied, the storage space for saving the optimized multilayer neural network model may be further reduced and the server resources necessary to operate the network model may be further reduced compared with the operation procedures in the conventional network model.

After optimizing the multilayer neural network model by using the optimization method of the first embodiment, the optimized network model may be applied. For example, an application of picture classification may be performed by inputting a data set corresponding to a task requirement that is executable by the multilayer neural network model, such as inputting pictures and the corresponding annotated truth values. The applicant compared the precision performances of the conventional multilayer neural network model (a network model not optimized by using the scheme of the embodiment of the present disclosure) and the multilayer neural network model optimized by using the scheme of the embodiment of the present disclosure when being applied, and found that the overall precision performances of the two network models are substantially close to each other. Taking the case where a picture classification service is performed by using the binary convolutional neural network model as an example, the precision performances of the binary convolutional neural network model without use of the scheme of the embodiment of the present disclosure and the precision performances of the network model with use of the scheme of the embodiment of the present disclosure are close to each other. Referring to Table 3, the picture classification precisions of them are 52.22% and 52.21%, respectively, and the precision difference is 0.01%, which is negligible. Therefore, after the multilayer neural network model is optimized by using the scheme of the embodiment of the present disclosure, the overall operation cost (the necessary processor resources and content resources) of the network model and the storage requirement have dropped significantly while maintaining the precision of the task processing, compared with the conventional multilayer neural network model.

TABLE 3

| | Model without Use of the Embodiment | Model with Use of the Embodiment |
| --- | --- | --- |
| Picture Classification Precision | 52.22% | 52.21% |

Second Embodiment

Figure 7:
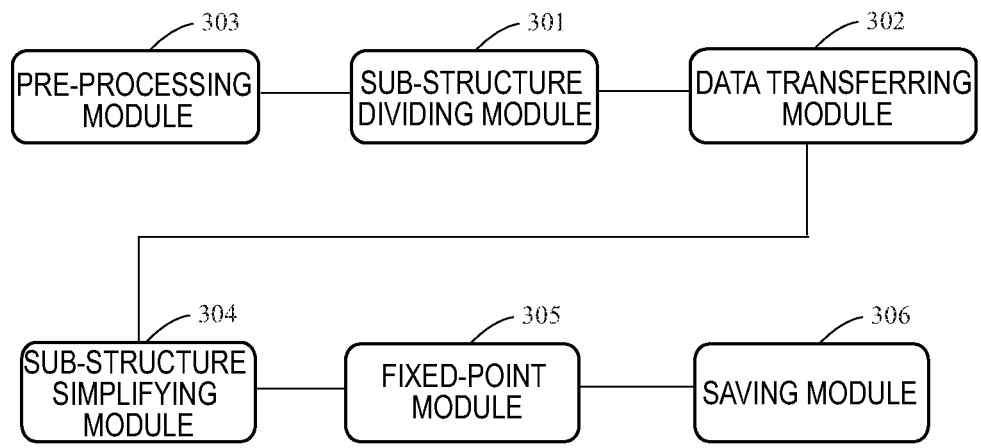
FIG. 7 shows a block diagram of an apparatus for optimizing the multilayer neural network model.

The second embodiment of the present disclosure describes an apparatus for optimizing a multilayer neural network model and as shown in FIG. 7, the apparatus includes a sub-structure dividing module 301 and a data transferring module 302. The sub-structure dividing module 301 may perform the processing in step S202 in the first embodiment, and the data transferring module 302 may perform the processing in step S203 in the first embodiment.

Specifically, the sub-structure dividing module 301 is configured to divide out at least one sub-structure from the multilayer neural network model, wherein a tail layer of the divided sub-structure is a quantization layer; and the data transferring module 302 is configured to transfer operation parameters and operation procedures in layers other than the quantization layer to the quantization layer for each of the divided sub-structures and update quantization threshold parameters in the quantization layer, thereby generating an optimized multilayer neural network model.

A convolution layer may further be included in the divided sub-structure. Furthermore, the head layer of the sub-structure is a convolution layer and the tail layer is a quantization layer. There may be other layers such as a batch normalization layer, a pooling layer, a scaling layer, and the like between the head layer and the tail layer, or there may have no other layers. When the number of the divided sub-structures is at least two, there is no nesting between the sub-structures.

The data transferring module 302 may be further configured to transfer the operation parameters and the operation procedures in an upper layer to a lower layer from top to bottom for each of layers other than the quantization layer in one sub-structure until the operation parameters and the operation procedures in each of layers are all transferred to the quantization layer, and update the quantization threshold parameters in the quantization layer.

In addition to the sub-structure dividing module 301 and the data transferring module 302 described above, the apparatus for optimizing the multilayer neural network model may further include a pre-processing module 303 configured to obtain a multilayer neural network model to be optimized. The pre-processing module 303 may perform the processing in step S201 in the first embodiment.

Preferably, the apparatus for optimizing the multilayer neural network model may further include a sub-structure simplifying module 304 configured to remove a layer in which the operation parameters and the operation procedures have been transferred to the quantization layer from the sub-structure for layers other than the quantization layer in each sub-structure. The sub-structure simplifying module 304 may perform the processing in step S204 in the first embodiment.

Preferably, the apparatus for optimizing the multilayer neural network model may further include a fixed-point module 305 configured to perform fixed-point processing for each of layers in the multilayer neural network model to convert floating-point operation parameters in each layer into fixed-point parameters. The fixed-point module 305 may perform the processing in step S205 in the first embodiment.

Preferably, the apparatus for optimizing the multilayer neural network model may further include a saving module 306 configured to save the optimized multilayer neural network model.

After the multilayer neural network model is optimized by the optimization apparatus of the second embodiment, the optimized network model may be operated by using an apparatus for applying the multilayer neural network model. The application apparatus may be a known apparatus for operating a network model and includes an inputting module for inputting a data set corresponding to a task requirement that is executable by the network model to the optimized multilayer neural network model; and an operating module for operating the data set in each of layers from top to bottom in the optimized multilayer neural network model and output results.

Further, in order to save the storage space for storing the quantization threshold parameters, in the optimization scheme for the multilayer neural network model of the first embodiment, the quantization threshold parameters updated after the transferring step may be expressed based on the aforementioned formula (14) by the base coefficient $\gamma$, the shift coefficient $\delta$, and the correlation relationship between the different quantization threshold parameters with respect to the base coefficient $\gamma$, that is, $\gamma$, $\delta$, and the correlation relationship between the different quantization threshold parameters with respect to the base coefficient $\gamma$ are stored. Thereafter, in the case where the network model optimized through the first embodiment is operated by using the application apparatus, the operating module determines quantization threshold parameters by using $\gamma$, $\delta$, and the correlation relationship between the quantization threshold parameters with respect to $\gamma$ when the input data set is operated to the quantization layer from top to bottom in the network model, and then performs quantization processing on the data set based on the determined quantization threshold parameters.

Figure 8:
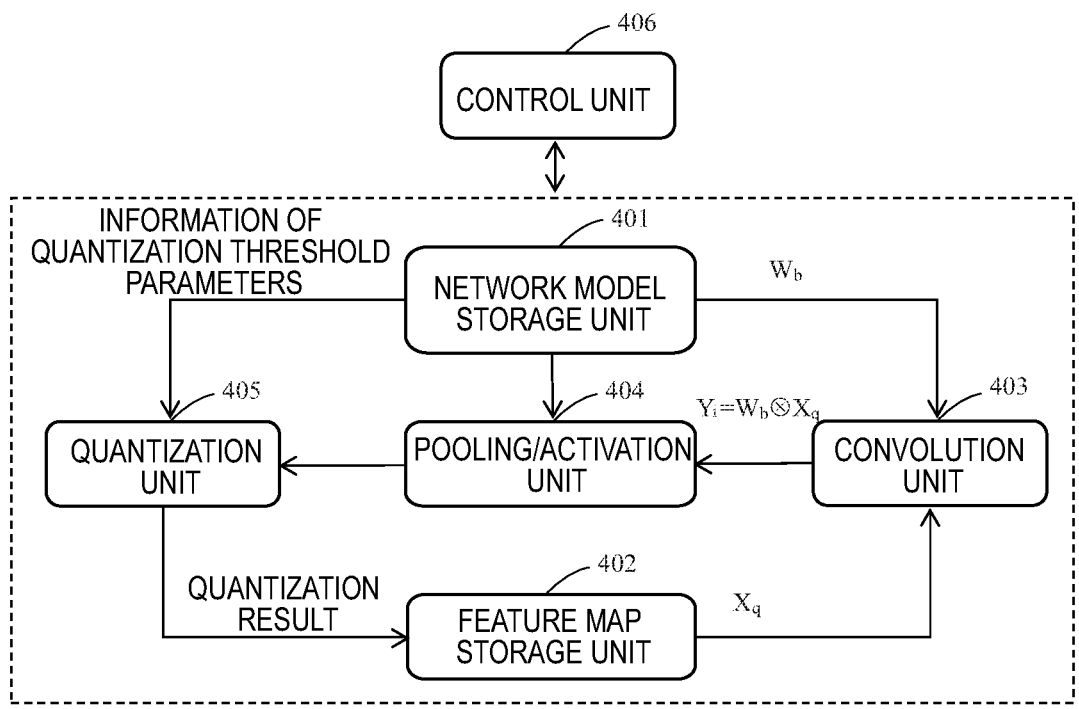
FIG. 8 illustrates a structure of an operating module in an application apparatus.

FIG. 8 illustrates a structure of an operating module in an application apparatus, and the data set is processed through the structure illustrated in FIG. 8 when the data set is input through the inputting module. Referring to FIG. 8, the operating module includes: a network model storage unit 401, a feature map storage unit 402, a convolution unit 403, a pooling/activation unit 404, a quantization unit 405, and a control unit 406. Each unit will be described below, respectively.

The network model storage unit 401 stores information related to the multilayer neural network model obtained by using the optimization method of the first embodiment, including but not limited to network structure information, information of quantization threshold parameters transferred to the quantization layer, and information required for the operations performed in each of other layers. Herein, the information of quantization threshold parameters transferred to the quantization layer may be $\gamma$, $\delta$, and the correlation relationship between the quantization threshold parameters with respect to $\gamma$, and may be the quantization threshold parameters themselves or other information capable of characterizing the quantization threshold parameters. The feature map storage unit 402 stores feature map information required during operation in the network model.

The convolution unit 403 is used to perform convolution processing on the data set according to the information (e.g., $W_b$) input by the network model storage unit 401 and the feature map information (e.g., $X_q$) of the i-th layer input by the feature map storage unit 402. The pooling/activation unit 404 is used to perform pooling/activation processing on the data set according to the information input by the network model storage unit 401 (for example, the information required when the pooling/activation processing is performed, wherein the network model storage unit 401 may have not input any information) and the output $Y_i = W_b \otimes X_q$ of the convolution unit 403. The quantization unit 405 is used to perform quantization processing on the data set according to the quantization threshold parameters input by the network model storage unit 401 and the result output from the pooling/activation unit 404, and the result after the quantization processing is stored in the feature map storage unit 402. The control unit 406 controls the operations of the network model storage unit 401 to the quantization unit 405 by outputting control signals to other units in FIG. 8.

It should be noted that the pooling/activation unit 404 capable of performing pooling/activation processing is exemplarily shown in the structure illustrated in FIG. 8, and other units capable of performing normalization processing and scaling processing that may be included are omitted. It will not be repeated here. In addition, in the sub-structure shown by the network structure information stored in the network model storage unit 401, there may be one or more of a batch normalization layer, a pooling layer, a scaling layer, and the like between the convolution layer and the quantization layer, or there may be none of these layers. In the case where, for example, there are only the convolution layer and the quantization layer in the sub-structure, the output result of the convolution unit 403 can be directly accessed to the quantization unit 405.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Embodiment(s) of the present disclosure can also be realized by a method of providing the software (program) that performs the functions of the above embodiments to the system or apparatus through a network or various storage media and reading and executing the method of the program by the computer of the system or apparatus or the central processing unit (CPU), the micro processing unit (MPU) and like.

While the present disclosure has been described with reference to exemplary embodiments, the scope of the following claims are to be accorded the broadest interpretation so as to encompass all such modifications and equivalent structures and functions.

The invention claimed is:

1. An apparatus for transforming a multilayer neural network model, comprising: one or more processors; and one or more memories coupled to the one or more processors, the one or more memories having stored thereon instructions which, when executed by the one or more processors, cause the apparatus to: extract, from the multilayer neural network model, at least one series of layers which include starts from a binary convolution layer and ends at a quantization layer and set each of the at least one extracted series of layers as a sub-structure, wherein in the binary convolution layer, a convolution of an input feature data and binarized weights is performed and a result of the convolution is multiplied with a scaling parameter and added with an offset parameter; merge, in the sub-structure, operations to be performed in the binary convolution layer and one or more layers other than the quantization layer into quantization in the quantization layer, by changing feature data to be input to the quantization layer and changing quantization threshold parameters to be used for quantization in the quantization layer based on the scaling parameter and the offset parameter used in the binary convolution layer and an operation parameter of the operation to be performed in the one or more layers; and remove, from the binary convolution layer and the one or more layers in the sub-structure, a layer which all the operations to be performed have been completely merged into the quantization in the quantization layer.

2. The apparatus according to claim 1, wherein, for each layer other than the quantization layer in the sub-structure, the operation parameters in an upper layer are transferred to a lower layer from top to bottom, until the operation parameters in each layer other than the quantization layer are transferred to the quantization layer in the sub-structure.

3. The apparatus according to claim 1, wherein the changed quantization threshold parameters are expressed by a base coefficient, a shift coefficient, and a correlation relationship between the quantization threshold parameters with respect to the base coefficient.

4. The apparatus according to claim 1, wherein the instructions, when executed by the one or more processors, further cause the apparatus to perform fixed-point processing for each of layers in the multilayer neural network model, such that floating-point operation parameters are converted into fixed-point parameters.

5. An apparatus for applying a multilayer neural network model, comprising: one or more processors; and one or more memories coupled to the one or more processors, the one or more memories having stored thereon instructions which, when executed by the one or more processors, cause the apparatus to: save the multilayer neural network model in the one or more memories, the multilayer neural network model is generated by: extracting, from the multilayer neural network model, at least one of layers which starts from a binary convolution layer and ends at a quantization layer and set each of the at least one extracted series of layers as a sub-structure, wherein in the binary convolution layer, a convolution of an input feature data and binarized weights is performed and a result of the convolution is multiplied with a scaling parameter and added with an offset parameter; merging, in the sub-structure, an-operations to be performed in the binary convolution layer and one or more layers other than the quantization layer into quantization in the quantization layer, by changing feature data to be input to the quantization layer and changing quantization threshold parameters to be used for quantization in the quantization layer based on the scaling parameter and the offset parameter used in the binary convolution layer and an operation parameter of the operation to be performed in the one or more layers; removing, from the binary convolution layer and the one or more layers in the sub-structure, a layer in which all the operations to be performed have been completely merged into the quantization in the quantization layer; input, to the saved multilayer neural network model, a data set corresponding to a task requirement that is executable by the multilayer neural network model; and operate on the data set in each of layers from top to bottom in the multilayer neural network model and output results.

6. The apparatus according to claim 5, wherein quantization threshold parameters in the multilayer neural network model saved in the one or more memories are expressed by a base coefficient, a shift coefficient, and a correlation relationship between the quantization threshold parameters with respect to the base coefficient; the instructions, when executed by the one or more processors, further cause the apparatus to determine the quantization threshold parameters by using the base coefficient, the shift coefficient, and the correlation relationship between the quantization threshold parameters with respect to the base coefficient when an input data set is operated in a quantization layer from top to bottom in the network model, and perform quantization processing on the data set based on the determined quantization threshold parameters.

7. A method for transforming a multilayer neural network model, comprising: extracting, from the multilayer neural network model, at least one series of layers which starts from a binary convolution layer and ends at a quantization layer and set each of the at least one extracted series of layers as a sub-structure, wherein in the binary convolution layer, a convolution of an input feature data and binarized weights is performed and a result of the convolution is multiplied with a scaling parameter and added with an offset parameter; merging, in the sub-structure an-operations to be performed in the binary convolution layer and one or more layers other than the quantization layer into quantization in the quantization layer, by changing feature data to be input to the quantization layer and changing quantization threshold parameters to be used for quantization in the quantization layer based on the scaling parameter and the offset parameter used in the binary convolution layer and an operation parameter of the operation to be performed in the one or more layers; and removing, from the binary convolution layer and the one or more layers in the sub-structure, a layer in which all the operations to be performed have been completely merged into the quantization in the quantization layer.

8. A method for applying a multilayer neural network model, comprising: saving the multilayer neural network model in a memory, the multilayer neural network model is generated by: extracting, from the multilayer neural network model, at least one series of layers which starts from a binary convolution layer and ends at a quantization layer and set each of the at least one extracted series of layers as a sub-structure, wherein in the binary convolution layer, a convolution of an input feature data and binarized weights is performed and a result of the convolution is multiplied with a scaling parameter and added with an offset parameter; merging, in the sub-structure-operations to be performed in the binary convolution layer and one or more layers other than the quantization layer into quantization in the quantization layer, by changing feature data to be input to the quantization layer and changing quantization threshold parameters to be used for quantization in the quantization layer based on the scaling parameter and the offset parameter used in the binary convolution layer and an operation parameter of the operation to be performed in the one or more layers; and removing, from the binary convolution layer and the one or more layers in the sub-structure, a layer in which all the operations to be performed have been completely merged into the quantization in the quantization layer; inputting, to the saved multilayer neural network model, a data set corresponding to a task requirement that is executable by the multilayer neural network model; and operating on the data set in each of layers from top to bottom in the multilayer neural network model and outputting results.

9. A non-transitory computer readable storage medium storing instructions for causing a computer to perform a method for transforming a multilayer neural network model when executed by the computer, the method comprising: extracting from the multilayer neural network model, at least one of layers which starts from a binary convolution layer and ends at a quantization layer and set each of the at least one extracted series of layers as a sub-structure, wherein in the binary convolution layer, a convolution of an input feature data and binarized weights is performed and a result of the convolution is multiplied with a scaling parameter and added with an offset parameter; merging, in the sub-structure an-operations to be performed in the binary convolution layer and one or more layers other than the quantization layer into quantization in the quantization layer, by changing feature data to be input to the quantization layer and changing quantization threshold parameters to be used for quantization in the quantization layer based on the scaling parameter and the offset parameter used in the binary convolution layer and an operation parameter of the operation to be performed in the one or more layers; and removing, from the binary convolution layer and the one or more layers the sub-structure, a layer in which all the operations to be performed have been completely merged into the quantization in the quantization layer.

10. A non-transitory computer readable storage medium storing instructions for causing a computer to perform a method for applying a multilayer neural network model when executed by the computer, the method comprising: saving the multilayer neural network model in a memory, the multilayer neural network model is generated by: extracting, from the multilayer neural network model, at least one series of layers which starts from a binary convolution layer and ends at a quantization layer and set each of the at least one extracted series of layers as a sub-structure, wherein in the binary convolution layer, a convolution of an input feature data and binarized weights is performed and a result of the convolution is multiplied with a scaling parameter and added with an offset parameter; merging, in the sub-structure, an-operations to be performed in the binary convolution layer and one or more layers other than the quantization layer into quantization in the quantization layer, by changing feature data to be input to the quantization layer and changing quantization threshold parameters to be used for quantization in the quantization layer based on the scaling parameter and the offset parameter used in the binary convolution layer and an operation parameter of the operation to be performed in the one or more layers; and removing, from the binary convolution layer and the one or more layers in the sub-structure, a layer in which all the operations to be performed have been completely merged into the quantization in the quantization layer; inputting, to the saved multilayer neural network model, a data set corresponding to a task requirement that is executable by the multilayer neural network model; and operating on the data set in each of layers from top to bottom in the multilayer neural network model and outputting results.

\* \* \* \* \*